US005620514A

United States Patent [19]
Munter et al.

[11] Patent Number: 5,620,514
[45] Date of Patent: Apr. 15, 1997

[54] DIFFERENTIAL-SPEED GRAVURE COATING OF MAGNETIZABLE LAYERS IN THE MANUFACTURE OF MAGNETIC RECORDING MEDIA

[75] Inventors: John D. Munter, Oakdale, Minn.; Donald M. Lewis, Hudson, Wis.; Joseph H. Lam, Woodbury; Kevin K. Kuck, Lino Lakes, both of Minn.; Michael J. Brost, Camarillo, Calif.; Norman E. Gehrke, Brownton, Minn.

[73] Assignee: Minnesota Mining and Manufacturing Company, St. Paul, Minn.

[21] Appl. No.: 522,859

[22] Filed: Sep. 1, 1995

Related U.S. Application Data

[63] Continuation of Ser. No. 294,079, Aug. 22, 1994, abandoned.

[51] Int. Cl.[6] ............................................. B05C 1/08
[52] U.S. Cl. .................... 118/249; 118/210; 118/212; 118/258; 118/263
[58] Field of Search ............................... 118/33, 58, 210, 118/212, 249, 258, 263, DIG. 14, DIG. 15; 427/130, 132, 599; 492/27, 30

[56] References Cited

U.S. PATENT DOCUMENTS

| | | | |
|---|---|---|---|
| 1,414,449 | 5/1922 | Witzig | 492/27 |
| 3,468,700 | 9/1969 | Long | 118/249 |
| 3,761,311 | 9/1973 | Perrington et al. | 117/239 |
| 4,254,585 | 3/1981 | Schoettle et al. | 51/5 A |
| 4,298,631 | 11/1981 | Mikura et al. | 427/130 |

(List continued on next page.)

FOREIGN PATENT DOCUMENTS

| | | |
|---|---|---|
| 50-22835 | 3/1975 | Japan . |
| 0067943 | 5/1980 | Japan ................................. 427/130 |
| 60-34828 | 2/1985 | Japan . |
| 60-57387 | 12/1985 | Japan . |
| 61-114775 | 6/1986 | Japan . |
| 2281419 | 11/1990 | Japan ................................. 427/130 |
| 3004966 | 1/1991 | Japan . |
| 5-128510 | 5/1993 | Japan . |
| 5345158 | 12/1993 | Japan . |

OTHER PUBLICATIONS

Benkreira et al.: "Direct Gravure Roll Coating", Chemical Engineering Science, vol. 48, No. 12, 1993, pp. 2329–2335.
Benkreira et al.: "Gravure Roll Coating of Low Viscosity Liquids", Surface Coatings International JOCCA, vol. 75, No. 7, Jul. 1992, pp. 261–268.
Patel et al.: "Gravure Roll Coating of Newtonian Liquids", Chemical Engineering Science, vol. 46, No. 3, 1991, pp. 751–756.
Pulkrabek et al.: "Knurl Roll Design for Stable Rotogravure Coating", Chemical Engineering Science, vol. 38, No. 8(1983), pp. 1309–1314.
Witt: "Reverse Gravure . . . Part I", Paper, Film & Foil Converter, vol. 51, Aug. 1977, pp. 41–43.
Witt: "Reverse Gravure . . . Part II", Paper, Film & Foil Converter, vol. 51, Sep. 1977, pp. 51–53.

*Primary Examiner*—Laura Edwards
*Attorney, Agent, or Firm*—Gary L. Griswold; Walter N. Kirn; Charles D. Levine

[57] ABSTRACT

A magnetizable layer can be applied to a flexible backing web by gravure coating at high speeds by independently driving the backing web at a speed that is substantially different from the surface speed of the gravure roll. Especially high coating speeds have been achieved when the gravure roll rotates oppositely to the direction in which the backing web is advancing. In one embodiment, a nip roll presses the backing web against the backup roll, there is a gap between the gravure roll and a backup roll, and an idler roll is positioned downstream of the gap to force the backing web into contact with the gravure roll over a short arc. When that backup roll has a hard surface such as metal, its surface can be machined with precision, and that precision can be maintained in spite of exposure to solvent vapors.

14 Claims, 6 Drawing Sheets

U.S. PATENT DOCUMENTS

| | | | |
|---|---|---|---|
| 4,313,981 | 2/1982 | Namiki | 492/27 |
| 4,361,627 | 11/1982 | Ohata | 428/425.9 |
| 4,391,851 | 7/1983 | Yamada et al. | 427/130 |
| 4,499,121 | 2/1985 | Yamaguchi et al. | 427/130 |
| 4,499,122 | 2/1985 | Economy et al. | 427/130 |
| 4,519,757 | 5/1985 | Wittkopf et al. | 425/143 |
| 4,547,393 | 10/1985 | Asai et al. | 427/48 |
| 4,577,077 | 3/1986 | Kawamata | 219/10.43 |
| 4,672,705 | 6/1987 | Bors et al. | 118/249 |
| 4,684,547 | 8/1987 | DiStefano et al. | 427/132 |
| 4,870,920 | 10/1989 | Kageyama et al. | 118/103 |
| 4,872,246 | 10/1989 | Yano | 492/27 |
| 4,911,951 | 3/1990 | Ogawa et al. | 427/130 |
| 4,917,040 | 4/1990 | Suzuki | 118/249 |
| 4,962,578 | 10/1990 | Saito et al. | 29/132 |
| 5,101,759 | 4/1992 | Hefele | 118/212 |

DIFFERENTIAL-SPEED GRAVURE COATING OF MAGNETIZABLE LAYERS IN THE MANUFACTURE OF MAGNETIC RECORDING MEDIA

This is a continuation of application Ser. No. 08/294,079, filed Aug. 22, 1994, now abandoned.

BACKGROUND OF THE INVENTION

1. Field of the Invention

The invention is primarily concerned with method and apparatus for making magnetic recording media using gravure coating to apply magnetizable layers.

2. Description of the Related Art

The magnetizable layers of most magnetic recording media consist of coatings of fine magnetizable particles in organic binder. A magnetizable coating should be of uniform thickness, typically less than 1.0 mil (25 µm), and should be free from defects such as pinholes, streaks, and particle agglomerates. The coating can be applied by a direct gravure coater as illustrated in U.S. Pat. No. 3,761,311 (Perrington et al.), FIG. 1 of which shows "a tank 10 which is continuously supplied with a dispersion 11 of magnetizable particles and binder. This is picked up in the fine grooves of a gravure roll 12 which is scraped by a doctor blade 13 so that substantially the only material left is that contained in the grooves. The dispersion is pressed by a rubber roll 14 into contact with and transferred to an uncoated backing member 15 which is moving at the same speed and in the same direction as the gravure roll 12, as indicated by the arrow 16. Before significant evaporation of the volatile vehicle, the knurl pattern of the coating is smoothed out by a flexible blade 17. The coated backing member then passes between a pair of bar magnets 18 to physically align the magnetizable particles and on to a heated oven 19 to dry the coating" (col. 4, line 65 through col. 5, line 4).

In the Perrington patent, the gravure roll drives both the backing member (below called the "backing web") and a backup roll (called "rubber roll 14" in the Perrington patent), and the magnetizable dispersion is transferred to the backing web in the mirror image of the cellular pattern of the gravure roll. In the quotation from the Perrington patent, that pattern is called "the knurl pattern" because the cells of gravure rolls are often formed by knurling, although other techniques are known such as etching.

Although it does not mention magnetic recording media, Pulkrabek et al.: "Knurl Roll Design for Stable Rotogravure Coating", *Chemical Engineering Science*, Vol. 38, No. 8 (1983), pages 1309–1314, contains useful information concerning the design of a gravure roll that is to be used in direct gravure coating to deposit a high-viscosity fluid such as a pigmented binder. One of the present inventors is a co-author of the Pulkrabek publication.

Figure 3:
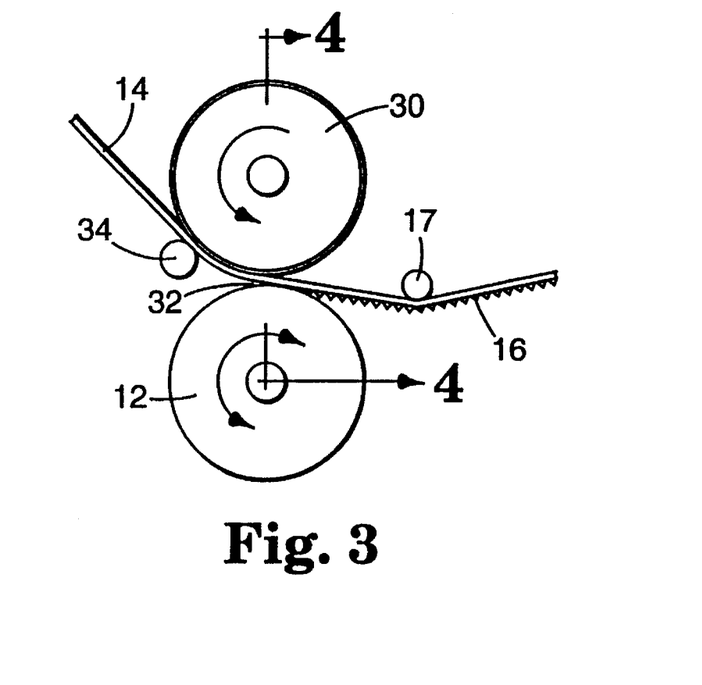
FIG. 3 is an fragmentary elevation of a second differential-speed gravure coating apparatus of the invention.

The Pulkrabek publication reports tests on a large number of gravure rolls, the cells of which are grooves with helix angles from 30° to 90°, tooth angles from 53° to 117.5°, and pitches from 5 to 39 grooves/cm. In spite of such variations, the volume of transferred fluid (the pickout) consistently amounted to about 59% of the volume of the grooves. To obtain uniform coatings that are substantially free from defects such as pinholes and streaks, proper or stable pickout is required, and to obtain stable pickout, the fluid in each groove of the gravure roll should transfer as one ridge of fluid as shown in FIG. 3. This is achieved when the "knurl roll coating line frequency" or "imposed ribbing frequency" matches the stable "natural ribbing frequency" of the fluid for the same wet coating thickness. To obtain the stable "natural ribbing frequency" of a fluid, it is deposited on a moving web by a roll coater or a spreader at a gap height that passes a volume of fluid per unit area equal to the volume passed by a gravure roll. As the web speed is increased, the number of ribs per unit width that form naturally per unit width increases until a maximum value is reached asymptotically. That maximum number is the stable natural ribbing frequency of the fluid.

The Pulkrabek publication explains that the "imposed ribbing frequency" is obtained by multiplying the groove pitch of the gravure roll times the sine of the helix angle. The ratio of the imposed ribbing frequency to the natural ribbing frequency is here called the "Ribbing Ratio" or "RR". The Pulkrabek publication says that proper or stable pickout requires an RR close to one. This and other parameters of the gravure roll must be closely controlled to obtain uniform coatings of high-viscosity fluids when the web is being driven by the gravure roll.

Stable pickout can be either "merged" (i.e., adjacent ridges of the coating are interconnected by the applied dispersion) or "open" (i.e., adjacent ridges of the coating are spaced). Whether merged or open, ridges of dispersions of magnetizable particles typically are too high in viscosity to self-level and hence must be smoothed before being allowed to dry. Although open pickout can be smoothed, the smoothing step is enhanced when the pickout is merged.

Although magnetizable layers of excellent quality can be applied while the backing web is being driven by the gravure roll at speeds up to about 400 ft/min (122 m/min), the following problems have been encountered at higher coating speeds: 1) difficulty in filling and doctoring the grooves, 2) misting, 3) the inability to achieve stable merged pickout, and 4) a tendency for very thin backing webs to wrinkle in the longitudinal direction, resulting in nonuniform coating thicknesses. Additionally, at a backing web speed of about 400 ft/min (122 m/min), it has not been feasible to attempt to coat to dry thicknesses less than 0.08 mil (2 µm).

Although each of the above-discussed references concern gravure coating in which the backing web is being driven by the gravure roll, reverse gravure coating has been known at least since the publication of Witt: "Reverse Gravure ... Part I", *Paper, Film & Foil Converter*, Vol. 51, August 1977, pages 41–43. The Witt publication does not mention magnetic recording media, but concerns the coating of aqueous dispersions of PVDC [poly(vinylidene chloride)]. Witt says that previously such dispersions had been mainly applied by air knife coating and that misting had been encountered at speeds of 110–130 m/min, a problem not encountered in reverse gravure coating. Witt says that to obtain coatings of good quality, the gravure (applicator) roll should turn at least as quickly as the web (p. 43, left col.). See also Witt: "Reverse Gravure ... Part II" *Paper, Film & Foil Converter,* Vol 51, Sept 1977, pages 51–53.

Reverse gravure coating is also discussed in Benkreira et al.: "Gravure Roll Coating of Low Viscosity Liquids", *Surface Coatings International JOCCA,* Vol. 75, No. 7, July 1992, pages 261–268. The Benkreira publications reports a first set of experiments with the speed ratio of unity (which is—1.0 in reverse gravure coating) and a second set of experiments with various speed ratios by altering the substrate speed while keeping the gravure roll speed at 0.83 m/s (p. 264, left col.).

The following two publications concern reverse gravure coating: Patel et al.: "Gravure Roll Coating of Newtonian Liquids", *Chemical Engineering Science*, Vol. 46, No. 3, 1991, pages 751–756, and Benkreira et al: "Direct Gravure Roll Coating", *Chemical Engineering Science*, Vol. 48, No. 12, 1993, pages 2329–2335. Although the first paragraph of each of these two publications mentions the coating thicknesses of "audio, video and computer tapes," nothing further is said about the coatings of such tapes. Instead, each publication states that it considers only Newtonian fluids, whereas coatable dispersions of magnetizable particles and binder are non-Newtonian.

SUMMARY OF THE INVENTION

The present invention avoids the aforementioned problems and enables a fluid dispersion of magnetizable particles and binder to be transferred by gravure coating to a flexible elongated backing web at speeds significantly greater than have been suitable when the backing web has been driven by the gravure roll, resulting in significantly reduced manufacturing costs. These improvements are accomplished by:

a) continuously supplying a fluid dispersion of magnetizable particles and binder to the grooves of a gravure roll that is being rotated at a constant speed, b) independently driving the flexible backing web longitudinally at a constant speed that is different from the surface speed of the gravure roll, and c) forcing the backing web into contact with the dispersion-bearing gravure roll to transfer a coating of wet dispersion to the backing web.

Because of the difference between the surface speeds of the gravure roll and the backing web, the present invention employs what is here called "differential-speed" gravure coating. The greatest differential in surface speeds occurs in reverse gravure coating when the gravure roll rotates oppositely to the direction in which the backing web is advancing. The ratio of the surface speeds of the gravure roll and the backing web is here called the "Speed Ratio." The Speed Ratio is negative during reverse gravure coating.

At positive Speed Ratios below one, the surface speed of the gravure roll preferably is reduced to a level at which there is no misting. There is no misting in reverse gravure coating, no matter how fast the surface of the gravure roll moves.

In both forward and reverse gravure coating, a reduction in the surface speed of the gravure roll reduces wear and thus prolongs the life of the gravure roll. Furthermore, this makes it easier to fill and doctor the grooves and to achieve uniform loading of the gravure grooves. Hence, the resultant coatings tend to have improved uniformity.

As compared to driving the backing web with the gravure roll, differential-speed gravure coating (including forward and reverse) yields three additional advantages: 1) stable merged pickout can be attained while advancing the backing web at very high speeds, (2) high coating speeds can be attained at gravure roll speeds that are slow enough to afford uniform loading of the groove and a long useful life, and (3) dried coatings of significantly different uniform thicknesses can be obtained simply by changing the Speed Ratio, thus allowing coatings to be obtained over a range of thicknesses without redesigning the gravure roll.

In forward differential-speed gravure coating, the helix angle of the gravure roll preferably is from 60° to 80°. At helix angles substantially above 80°, it becomes difficult to smooth the coatings, whereas helix angles of at least 60° allow stable merged pickout to be achieved over a greater range of Speed Ratios than can be achieved at lower helix angles.

As compared to forward differential-speed gravure coating, reverse gravure coating affords stable merged pickout from virtually any gravure roll and at all coating speeds and Speed Ratios from −0.3 to −2.0. Stable merged pickout is obtained with gravure rolls having helix angles from 90° to close to 0°, but helix angles of from 30° to 60° are preferred, because outside that range, other parameters must be more closely controlled to obtain stable merged pickout. Furthermore, helix angles of from 30° to 60° are easier and more economical to manufacture as compared to helix angles outside that preferred range. When the helix angle of a gravure roll is within that preferred range, the hills and valleys of merged pickout obtained in reverse gravure coating are closer to the same thickness than can be achieved either when the backing web is being driven by the gravure roll or in forward differential-speed gravure coating, and they consequently are easier to smooth.

In forward differential-speed gravure coating, the Speed Ratio preferably is from 0.3 to 0.9 or from 1.1 to 2.0, more preferably from 0.6 to 0.8. At Speed Ratios from 0.3 to 0.6, stable open pickout is usually obtained except at slow coating speeds, while Speed Ratios above 0.6 generally result in merged pickout at any coating speed. Forward differential-speed gravure coating, as compared to reverse gravure coating, is more forgiving of variations in the doctoring of the gravure roll.

In general, differential-speed gravure coating, as compared to driving the backing web with the gravure roll, allows much greater leeway in the design of a gravure roll that is to be used to apply magnetizable coatings. To achieve merged pickout when driving the backing web with the gravure roll, it sometimes has been necessary to make land widths so small that they are worn down quickly by the abrasiveness of the coating dispersion. In contrast, differential-speed gravure coating affords stable merged pickout using gravure rolls having land widths greater than would afford stable merged pickout when driving the backing web with the gravure roll. Preferably the lands are from 3 to 30 mils (75 to 750 µm) in width, more preferably from 6 to 20 mils (150 to 500 µm). At land widths within those preferred ranges, a gravure roll should have a desirably long useful life, and it should be easy to smooth the pickout.

Differential-speed gravure coating produces coating speeds far greater than the aforementioned limit of about 400 ft/min (122 m/min) when the backing web has been driven by the gravure roll. Reverse gravure coating permits even higher speeds as compared to forward differential-speed gravure coating.

Reverse gravure coating produces uniform coatings that are much thinner than could be obtained when the backing web was driven by the gravure roll, namely magnetizable coatings having dry thicknesses of only 0.01 mil (0.25 µm) as compared to the minimum of 0.08 mil (2 µm) that we have been able to attain when the backing web has been driven by the gravure roll.

DETAILED DESCRIPTION

Figure 1:
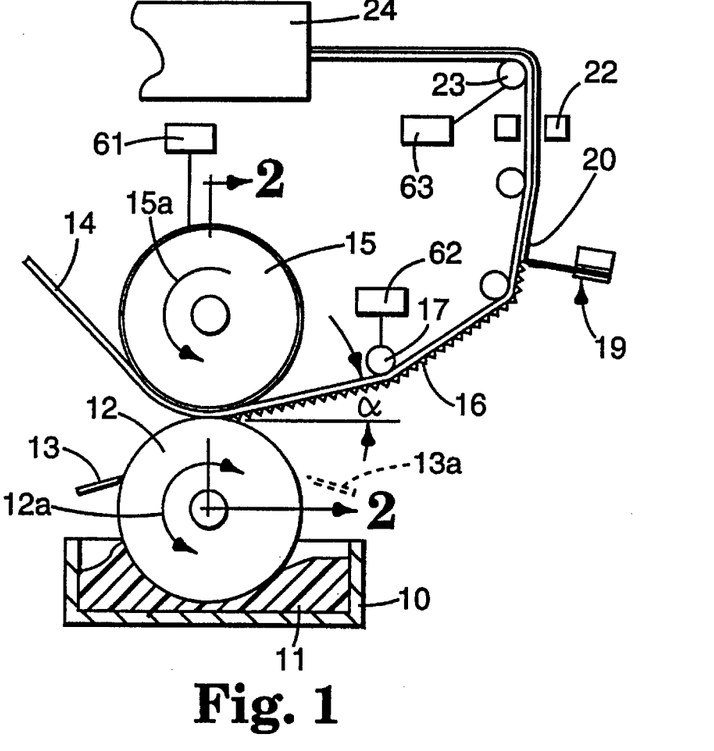
FIG. 1 is an elevation of a differential-speed gravure coating apparatus for continuously transferring a dispersion of magnetizable particles and binder to a flexible backing web in accordance with the invention.

Referring to FIG. 1, a pan 10 of a gravure coater is continuously supplied with a fluid dispersion 11 of magnetizable particles and binder. This is picked up in the fine grooves of a gravure roll 12 which can be driven either clockwise or counterclockwise as indicated by the 2-headed arrow 12a. When the gravure roll is driven clockwise, it is scraped by a doctor blade 13 so that substantially the only material left is that contained in the grooves. When the gravure roll is driven counterclockwise, the doctor blade is moved to the location indicated by dotted lines 13a where it is shown in a retracted position.

A flexible backing web 14 is entrained around a backup roll 15 which has a compliant surface and is independently driven in the direction of an arrow 15a. The backing web is forced into contact with the dispersion-bearing gravure roll by moving the backup roll and/or gravure roll into contact with each other. Preferably, the force of such movement slightly deforms the backup roll, but the force should be restricted to a level that does not slow the rotational speeds of either the gravure roll or the backup roll. A coating 16 of wet dispersion transfers from the gravure roll to the backing web which moves substantially horizontally as it emerges from the gap between the gravure roll 12 and the backup roll 15. As shown, the backup roll 15 can be moved by a means 61 for maintaining the gap between the backup roll 15 and the gravure roll 12. This maintaining means 61 can also adjust and increase the gap.

Next, the uncoated face of the backing web contacts a take-off idler roll 17, the position of which is vertically adjustable by a means 62 for adjusting the position of the take-off idler roll to provide a take-off angle α of from −20° to 20° to a line perpendicular to a line connecting the centers of the gravure roll and backup roll. Before significant evaporation of volatile vehicle, the wet coating 16 is smoothed out by an assembly 19 including a rectangular piece of flexible film 20 that drags against the wet coating. The coated backing web passes between a pair of bar magnets 22, thus physically aligning the magnetizable particles, and is overdriven by a pull roll 23, which can be overdriven by an overdriving means 63, at a constant speed, thus creating a back tension in the backing web. The backing web then passes through a heated oven 24 to dry the coating.

Figure 2:
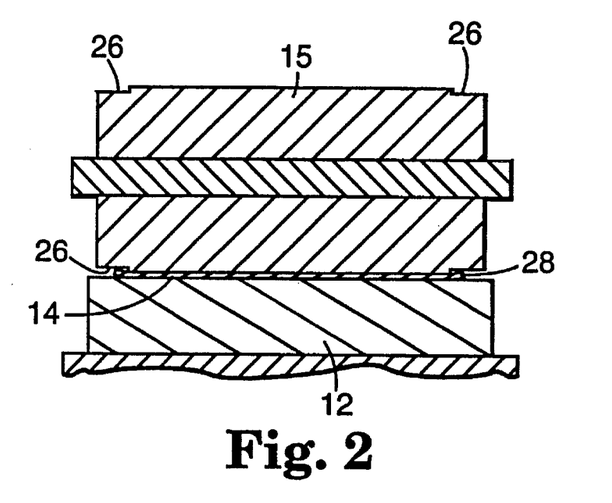
FIG. 2 is a cross section along line 2—2 of FIG. 1.

As can be seen in FIG. 2, the backup roll 15 has an undercut 26 at each end, and the backing web 14 is wider than the length of the cylindrical surface between the undercuts. Because of the back tension, both edges 28 of the backing web 14 are pulled back from the gravure roll into the undercut spaces and so do not contact the wet dispersion. If the coated backing web did not have uncoated edges, some of the wet dispersion, upon being smoothed by the flexible film 20, would be pushed to the uncoated side of the flexible film and transferred to downstream rolls.

Figure 4:
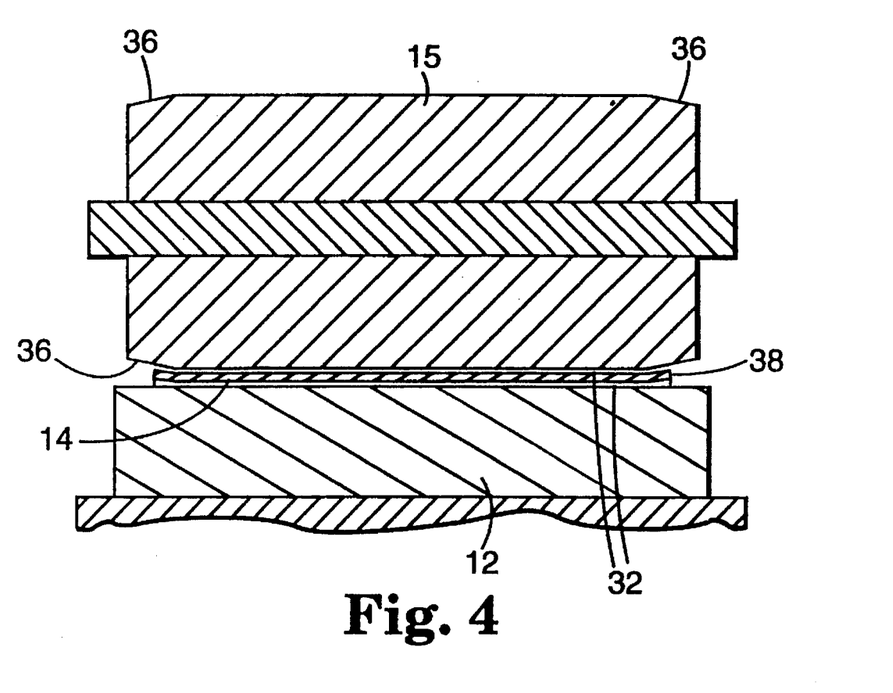
FIG. 4 is a cross section along line 4—4 of FIG. 3.

The apparatus of FIGS. 3 and 4 differs from that of FIGS. 1 and 2 in that (1) a backup roll 30 is positioned upstream of the gravure roll 12 and can have either a hard or a compliant surface, (2) there is a gap 32 between the backup roll and the gravure roll, (3) a nip roll 34 presses the backing web 14 against the backup roll, thus ensuring that the backing web is driven at the surface speed of the backup roll, and (4) the take-off idler roll 17 is positioned to force the backing web into contact with the gravure roll 12 over a short arc. The nip roll 34 has a compliant surface when that of the backup roll 30 is hard, or a hard surface when that of the backup roll is compliant.

When the backing web 14 is thin, e.g., less than 1.0 mil (25 µm), the gap 32 should be small, preferably from 2 to 50 mils (50 to 1250 µm), more preferably less than 20 mils (500 µm) so that the backing web contacts the dispersion-bearing gravure roll immediately after leaving the backup roll. A narrow gap counteracts the tendency of a thin backing web to wrinkle longitudinally, thus keeping it flat during the transfer of the wet dispersion from the gravure roll.

A backup roll with a hard surface, preferably a metal surface, provides at least two advantages. First, it can be machined with greater precision than can a compliant roll, thus enhancing the flatness of a thin backing web while the dispersion is being transferred. Second, a hard backup roll keeps its precision surface in spite of exposure to dispersion-solvent vapors that could cause a compliant backup roll to swell or otherwise become damaged.

The apparatus of FIGS. 3 and 4 can include means (not shown) for momentarily increasing the gap 32 (preferably by retracting the take-off idler roll 17) to allow a splice to pass without being coated. Doing so affords several advantages:

(1) a splice can produce splattering at a narrow gap,
(2) the coating at a splice is nonuniform, and any unusually thick area might come loose, e.g. if it does not dry properly, and thus result in contamination,
(3) there is less waste upon discarding the spliced area.

When the spliced area is not coated, the smoothing assembly 19 preferably is retracted at the splice. Otherwise, contact between the uncoated backing web 14 and the flexible film 20 might pull the flexible film out of its mount.

As can be seen in FIG. 4, there is an undercut that forms a bevel 36 at each end of the backup roll 30, and the length of the cylindrical surface of the backup roll is less than the width of the backing web 14. The back tension on the backing web pulls its edges 38 against the bevels so that the edges remain uncoated. The bevels 36 also keep the backing web flat, a function not required in the apparatus of FIGS. 1 and 2 wherein pressure between the backup roll 15 and the gravure roll 12 keeps the backing web flat. Preferably, the angle of the bevel is from 5° to 30° to the axis of the backup roll, more preferably from 10° to 20°.

Figure 5:
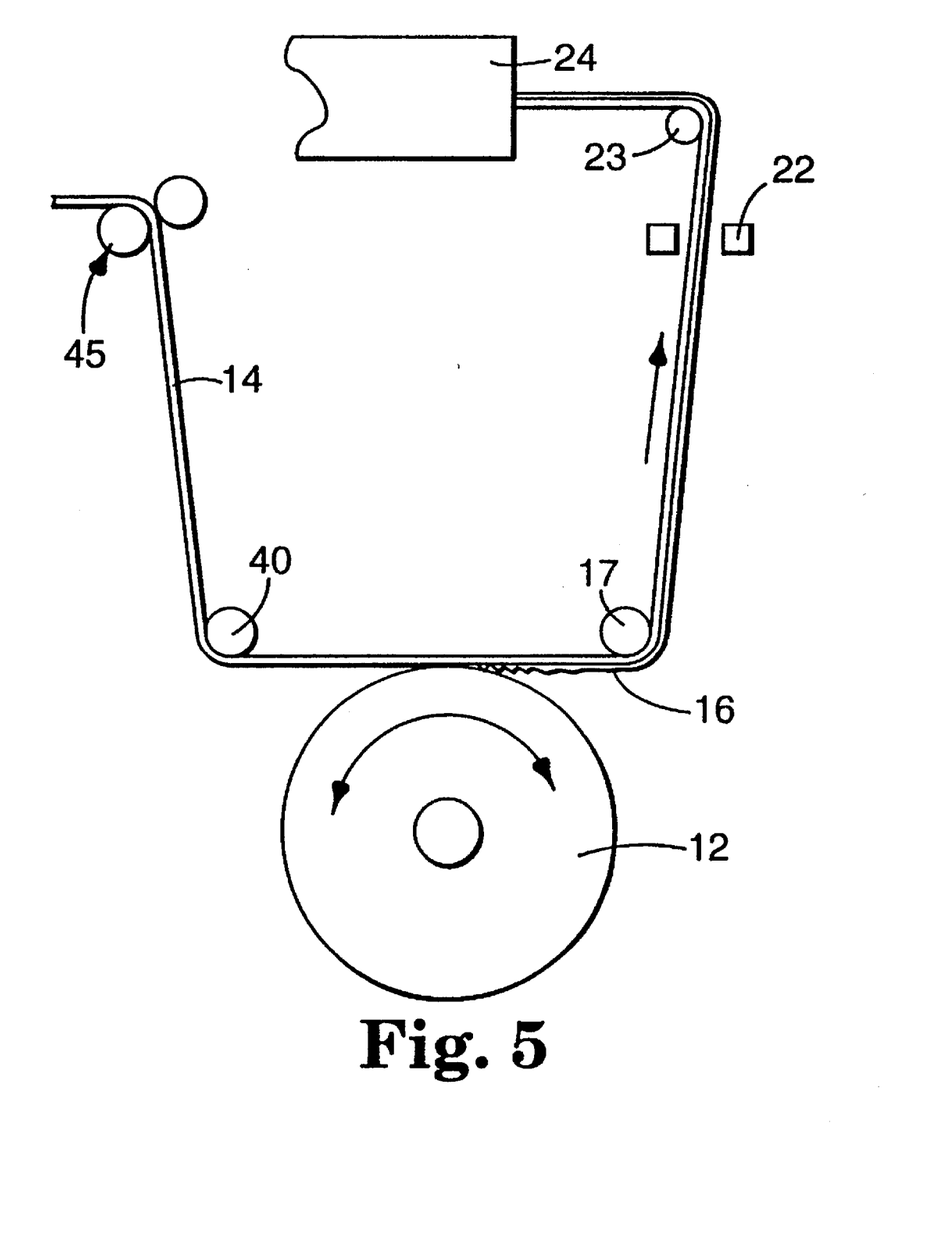
FIG. 5 is an fragmentary elevation of a third differential-speed gravure coating apparatus of the invention; and Each of FIGS. 6–8 is a graph showing the effects on dried coating thicknesses of different Speed Ratios under various differential-speed gravure coating conditions.

In the apparatus of FIG. 5, the flexible backing web 14 is entrained around an input idler roll 40 and a take-off idler roll 17, respectively, at least one of which is movable to force the backing web into contact with the gravure roll 12 over a short arc. As in FIG. 1, the backing web is overdriven at a constant speed by a pull roll 23, and back tension is maintained by a capstan/nip roll assembly 45, thus holding the backing web firmly against the gravure roll. The flexible backing web should have adequate stiffness and tensile strength to withstand back tension without wrinkling and, for this reason, backing webs having thicknesses less than 1 or 2 mils (25 or 50 µm) preferably are coated in the apparatus either of FIGS. 1–2 or of FIGS. 3–4 in which the back tension can be lower than in the apparatus of FIG. 5.

The width of the backing web is less than the length of the grooved area of the gravure roll, so that the full width of the backing web is coated. Because a full-width coating cannot be smoothed without pushing wet dispersion onto guide rolls, the dispersion should be self-leveling. However, when the idler rolls 40 and 17 have beveled edges on which the edges of the backing web ride, the backing web can have uncoated edges.

In the apparatus of FIG. 5, the input idler roll 40 can be moved from the position shown to be close to the gravure roll (to a position comparable to that of the backup roll 30 of FIGS. 3–4) and the takeoff idler roll 17 also can be moved closer to the gravure roll.

The apparatus of FIG. 5 differs from that of FIGS. 3–4 in that (1) it employs an input idler roll 40 instead of a driven backup roll 30, (2) back tension in the backing web is maintained by the capstan/nip roll assembly 45 instead of the driven backup roll 30 and nip roll 34, and (3) the driven backup roll 30 and smoothing apparatus 19 of FIGS. 3–4 are eliminated. Because of that elimination, the apparatus of FIG. 5 is more economical to manufacture, to operate, and to maintain than is the apparatus of FIGS. 3–4.

In the apparatus of FIG. 5, a splice can pass without being coated by momentarily retracting either of the idler rolls 40 or 17.

Each apparatus of FIGS. 1–5 affords both forward and reverse differential-speed gravure coating. In both forward and reverse, changes in Speed Ratio result in different coating thicknesses. Illustrative results are shown in FIGS. 6–8.

Figure 6:
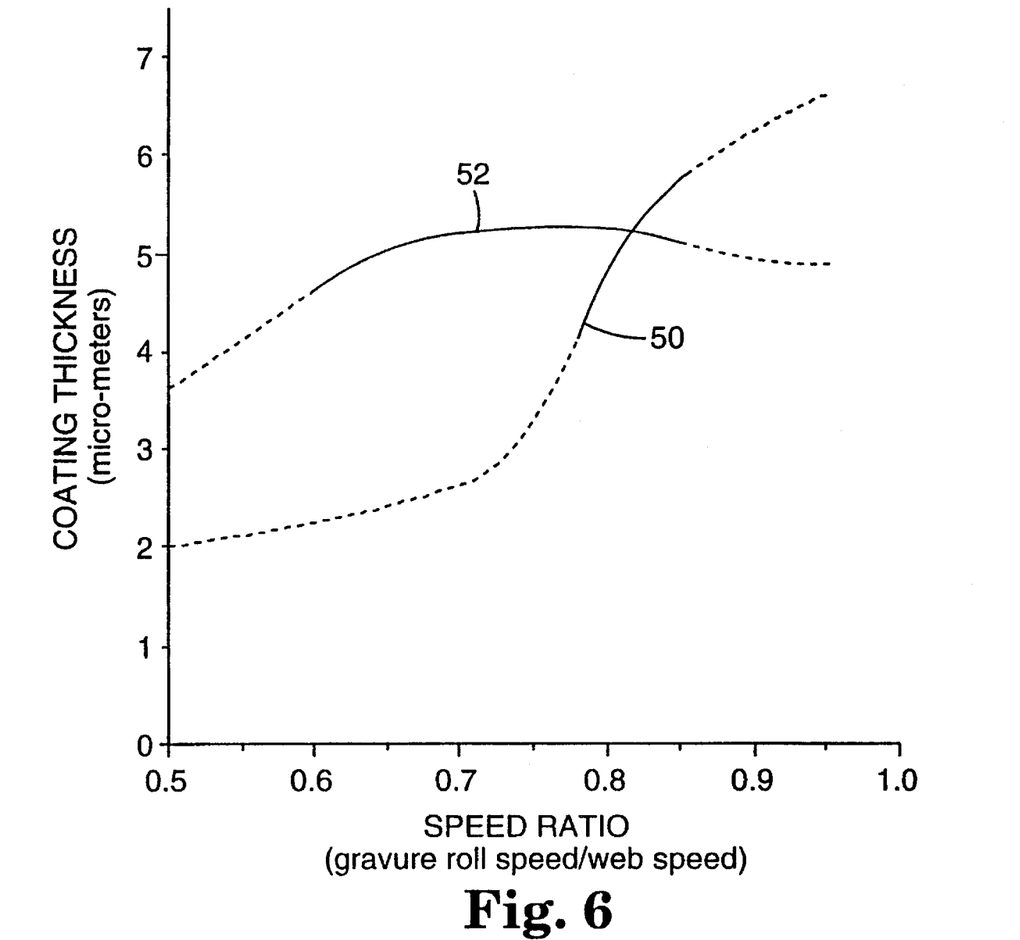

Referring to FIG. 6, curves 50 and 52 show relationships between dried coating thicknesses and Speed Ratios that have been observed when using gravure rolls with helix angles of 45° and 80°, respectively, in forward differential-speed gravure coating using the apparatus of FIGS. 1–2. The solid portion of each curve indicates the range over which stable merged pickout was attained.

Figure 7:
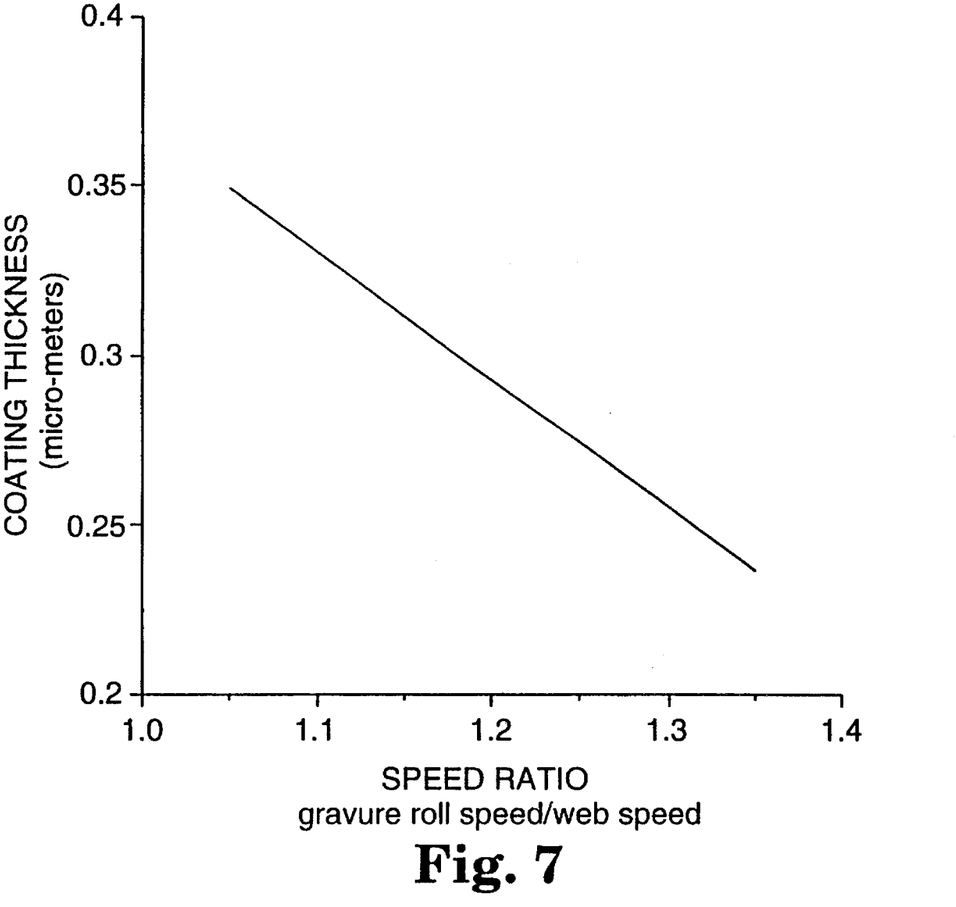

In FIG. 7, a curve 55 shows a relationship between dried coating thicknesses and Speed Ratios that has been observed in reverse differential-speed gravure coating on the apparatus of FIGS. 1–2. Stable merged pickout was attained over the full length of the curve 55.

Figure 8:
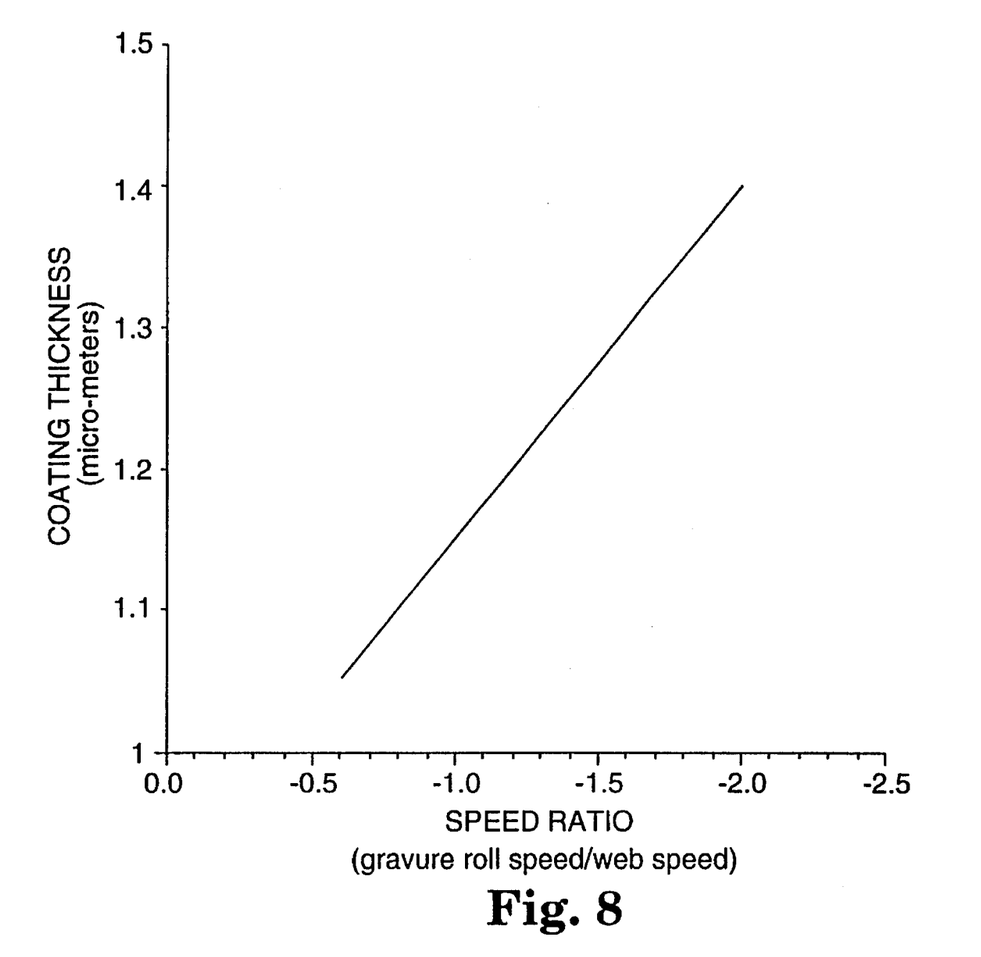

In FIG. 8, a curve 58 shows a relationship between dried coating thicknesses and Speed Ratios that has been observed in reverse differential-speed gravure coating on the apparatus of FIG. 5. Stable merged pickout was attained over the full length of the curve 58.

As demonstrated in each of FIGS. 6, 7, and 8, dried coatings of different uniform thicknesses can be obtained in differential-speed gravure coating simply by changing the Speed Ratio, thus allowing coatings of various thicknesses to be obtained with a given gravure roll. However, a different gravure roll may be required to effect a large change in dried coating thickness, making it necessary to modify other factors as tooth angle, pitch, and land width.

In differential-speed gravure coating of the invention, the tooth angle preferably is of from 70° to 140° and the pitch is from 5 to 250 grooves/inch (2 to 100 grooves/cm). If the tooth angle were substantially less than 70° or the pitch of the grooves were substantially greater than 250 grooves/inch (100 grooves/cm), the fluid dispersion might not be picked out uniformly, especially when its viscosity is high. Furthermore, larger tooth angles are easier to clean. On the other hand, it is difficult to form precise grooves having tooth angles substantially greater than 140°. Ideally, the tooth angle is from 100° to 120°.

Although the Ribbing Ratio is of great importance when the backing web is driven by the gravure roll, it is of little importance in differential-speed gravure coating and of almost no importance in reverse gravure coating.

EXAMPLE 1

The apparatus of FIGS. 1 and 2 was employed to apply magnetizable coatings by forward differential-speed gravure coating onto a flexible backing web consisting of biaxially oriented poly(ethyleneterephthalate) film having a thickness of 0.56 mil (14 µm) and a width of 12.5 inches (31.8 cm). The length of the cylindrical surface of the backup roll 15 between the undercuts 26 was 12.375 inches (31.4 cm). The depth of each undercut was 0.125 inch (0.3 cm). Salient features of the gravure roll were:

| | |
| --- | --- |
| diameter | 10 inches (25 cm) |
| width | 20 inches (50 cm) |
| helix angle | 45° |
| pitch | 50 grooves/inch (19.7 grooves/cm) |
| land width | 3.4 mils (86 µm) |
| tooth angle | 115° |

Continuously supplied to the gravure roll was a dispersion of acicular $Fe_2O_3$ particles in a solution of polyurethane binder in methylethylketone. The dispersion had a solids content of 38% and a viscosity of 20 cps at 10000 $sec^{-1}$ shear rate. The coating apparatus included a steel blade for scraping dispersion from the lands.

While the backing web was advanced at a speed of 1000 ft/min (305 m/min), a number of coatings were applied at different Speed Ratios by changing the surface speed of the gravure roll. Each of the wet coatings was smoothed, magnetically oriented, and dried to provide a magnetizable layer of uniform thickness. Thicknesses of the magnetizable layers at different Speed Ratios were charted as shown by curve 50 of FIG. 6. Each of the magnetizable layers was virtually free from defects, both when examined under a microscope and when used to record and play back information.

EXAMPLE 2

The apparatus of FIGS. 1 and 2 was employed to apply a magnetizable coatings by forward differential-speed gravure coating in the same way as in Example 1 except that the helix angle of the gravure roll was 80° and the tooth angle was 120°. Thicknesses of the magnetizable layers at different Speed Ratios were charted as shown by curve 52 of FIG. 6.

EXAMPLE 3

The apparatus of FIGS. 1 and 2 was employed to apply magnetizable coatings by reverse gravure coating onto a flexible backing web identical to that of Example 1. Salient features of the gravure roll were:

| | |
| --- | --- |
| diameter | 10 inches (25 cm) |
| width | 20 inches (50 cm) |
| helix angle | 45° |
| pitch | 40 grooves/inch (15.7 grooves/cm) |
| land width | 13.8 mils (350 µm) |
| tooth angle | 90° |

The coating procedure of Example 1 was followed except that dispersion had a solids content of 34% and a viscosity of 15 cps at 10000 $sec^{-1}$ shear rate, and the backing web was advanced at a speed of 1000 ft/min (305 m/min). Thicknesses of the magnetizable layers at different Speed Ratios were charted as shown by curve 55 of FIG. 7.

EXAMPLE 4

The apparatus of FIG. 5 was employed to apply magnetizable coatings by reverse gravure coating onto a flexible backing web identical to that of Example 1. The backing web was in contact with the gravure roll over an arc of about 3°–6°. Salient features of the gravure roll were:

| | |
|---|---|
| diameter | 10 inches (25 cm) |
| width | 20 inches (50 cm) |
| helix angle | 45° |
| pitch | 160 grooves/inch (63 grooves/cm) |
| land width | 2.8 mils (71 μm) |
| tooth angle | 70° |

The coating procedure of Example 1 was followed except that except that dispersion had a solids content of 15% and a viscosity of 14 cps at 10000 sec$^{-1}$ shear rate, and the backing web was advanced at a speed of 500 ft/min (150 m/min). Thicknesses of the magnetizable layers at different Speed Ratios were charted as shown by curve 58 of FIG. 8.

What is claimed is:

1. Apparatus for coating a fluid dispersion of magnetizable particles and binder onto a flexible elongated backing member that is being advanced longitudinally to produce a magnetizable layer of a magnetic recording medium, said apparatus comprising:

a) a gravure roll, b) means for rotating the gravure roll at a constant speed, c) means for continuously supplying a fluid dispersion of magnetizable particles and binder to the gravure roll while it is being rotated, d) a backup roll which has a non-compliant surface, e) means for rotating the backup roll at a constant surface speed independently of a surface speed of the gravure roll, f) a compliant nip roll positioned for holding the backing member against the backup roll upstream of the gravure roll to drive the backing member at the surface speed of the backup roll, g) means, connected to at least one of the backup roll and gravure roll, for maintaining a gap between the backup roll and gravure roll, and h) means for forcing the backing member into contact with the gravure roll over an arc to allow fluid dispersion to transfer from the gravure roll to the backing member.

2. Apparatus as defined in claim 1 wherein the means for maintaining a gap maintains the gap to between 50 and 1250 μm.

3. Apparatus as defined in claim 1 wherein said forcing means comprises a take-off idler roll positioned downstream of the gravure roll.

4. Apparatus as defined in claim 3 and further comprising means for adjusting the position of the take-off idler roll to a take-off angle α of from −20° to 20° to a line perpendicular to a line connecting the centers of the gravure roll and backup roll.

5. Apparatus as defined in claim 4 wherein said means for adjusting the position of the take-off idler roll is adjustable to force the backing member into contact with the gravure roll over an arc of 3°–6°.

6. Apparatus as defined in claim 1 wherein the backup roll is formed with an undercut at each end.

7. Apparatus as defined in claim 6 wherein each undercut is a bevel.

8. Apparatus as defined in claim 7 wherein the angle of the bevel is from 5° to 30° to the axis of the backup roll.

9. Apparatus as defined in claim 1 and further comprising a pull roll downstream of the gravure roll.

10. Apparatus as defined in claim 9 and further comprising means for overdriving the pull roll to create sufficient back tension in the backing member to hold it firmly against the gravure roll.

11. Apparatus for coating a fluid dispersion of magnetizable particles and binder onto a flexible elongated backing member that is being advanced longitudinally to produce a magnetizable layer of a magnetic recording medium, said apparatus comprising:

a) a gravure roll, b) means for rotating the gravure roll at a constant speed, c) means for continuously supplying a fluid dispersion of magnetizable particles and binder to the gravure roll while it is being rotated, d) a backup roll which has a non-compliant surface, e) means for rotating the backup roll at a constant surface speed independently of a surface speed of the gravure roll, f) a compliant nip roll positioned for holding the backing member against the backup roll upstream of the gravure roll to drive the backing member at the surface speed of the backup roll, g) means, connected to at least one of the backup roll and gravure roll, for maintaining a gap between the backup roll and gravure roll and for adjusting said gap to spacings from 50 to 1250 μm, h) a take-off idler roll positioned downstream of the gravure roll, i) means for adjusting the position of the take-off idler roll to force the backing member into contact with the gravure roll over an arc to allow fluid dispersion to transfer from the gravure roll to the backing member, j) means downstream of the take-off idler roll for overdriving the backing member to create sufficient back tension in the backing member to hold it firmly against the gravure roll.

12. Apparatus as defined in claim 11 wherein the backup roll is formed with an undercut at each end.

13. Apparatus as defined in claim 12 wherein each undercut is a bevel of from 5° to 30° to the axis of the backup roll.

14. Apparatus for coating a fluid dispersion of magnetizable particles and binder onto a flexible elongated backing member that is being advanced longitudinally to produce a magnetizable layer of a magnetic recording medium, said apparatus comprising:

a) a gravure roll, b) means for rotating the gravure roll at a constant speed, c) means for continuously supplying a fluid dispersion of magnetizable particles and binder to the gravure roll while it is being rotated, d) a backup roll, e) means for independently rotating the backup roll at a constant speed that is different from a surface speed of the gravure roll, f) a nip roll positioned for holding the backing member against the backup roll upstream of the gravure roll to drive the backing member at a surface speed of the backup roll, g) means, connected to at least one of the backup roll and gravure roll, for maintaining a gap between the backup roll and gravure roll, and for increasing the gap between the backup roll and the gravure roll to allow a splice to pass uncoated, and h) means for forcing the backing member into contact with the gravure roll over an arc to allow fluid dispersion to transfer from the gravure roll to the backing member.

* * * * *